Nov. 10, 1970

J. R. IOANNILLI 3,538,527

METHOD OF MANUFACTURING MOCCASINS

Filed April 25, 1969

Inventor
Joesph R. Ioannilli
By his Attorney

Nov. 10, 1970  J. R. IOANNILLI  3,538,527
METHOD OF MANUFACTURING MOCCASINS
Filed April 25, 1969  4 Sheets-Sheet 2

Nov. 10, 1970 J. R. IOANNILLI 3,538,527
METHOD OF MANUFACTURING MOCCASINS
Filed April 25, 1969 4 Sheets-Sheet 4

United States Patent Office 3,538,527
Patented Nov. 10, 1970

3,538,527
METHOD OF MANUFACTURING MOCCASINS
Joseph R. Ioannilli, Beverly, Mass., assignor to USM Corporation, Boston, Mass., a corporation of New Jersey
Filed Apr. 25, 1969, Ser. No. 819,296
Int. Cl. *A43d 9/00*
U.S. Cl. 12—142  10 Claims

ABSTRACT OF THE DISCLOSURE

A method of manufacturing a composite article comprising a set of parts including a first and a second part, having seam receiving margins, the margin of one part being longer than that of the other, as for example, moccasins comprising a vamp adapted to underlie the wearer's foot and having an edge joined to the shorter edge of a central toe covering plug. According to the present method the vamp is connected to the plug starting with both parts in flat condition and forming a three-dimensional pouch progressively as the edge of the vamp is joined by a seam to that of the plug. In the process, the longer edge of the vamp is puckered to match that of the plug. After the completion of the sewing operation, the moccasin assembly consisting of the vamp and plug is stretched on a last to give it shape and thereafter finishing operations are carried out in a conventional manner.

---

The present invention relates generally to improvements in methods of manufacturing composite articles such as mocasins and more particularly to methods of assembly. The term "moccasin" will be understood to mean "a shoe in which a vamp, a part of the upper, underlies the wearer's foot particularly in the toe area and is joined by a seam to a toe covering plug." In some respects the present method may advantageously be practiced on a machine such as that disclosed in application Ser. No. 829,309, filed June 2, 1969 in the name of the present inventor.

Conventionally moccasins are hand assembled on a last by a tedious time consuming process requiring considerable skill. In the conventional process, a thoroughly mulled vamp is stretched progressively over the last as its edge is joined to that of a plug by a hand formed moccasin seam, a two thread through and through seam, in which each thread passes through a stitch hole and alternately over te surface of the plug and of the vamp. The only locking effect included in the seam is a half turn or twist between the two threads in the stitch hole. The skill is required because the seam not only joins the parts but also stretches the vamp and plug over the last to give the shoe its shape. Since the operator must exercise care to obtain acceptably uniform products particularly in view of unavoidable variations in leather, the sewing of moccasins by hand is both time consuming and expensive.

An object of the present invention is accordingly to reduce the cost while improving the quality of moccasins.

Another object is to reduce the skill necessary for the key operation of sewing the vamp to the plug in the manufacture of moccasins.

Still another object is to enhance both the uniformity and durability of moccasins while at the same time reducing their cost of manufacture.

Yet another object is to achieve the foregoing improvements while retaining the comfort factor and appearance of moccasins which are produced by conventional hand sewn methods.

In the achievement of the foregoing objects a feature of the invention relates to a method including a step of joining the vamp to the plug of a moccasin by a lockstitch seam while both parts are in initially flat condition. As the insertion of the seam progresses the parts acquire a three dimensional pouch form. A last is thereafter inserted into the pouch to give the moccasin its form as a preliminary step to finishing the shoe by one of several alternative conventional processes.

The objects, features, and numerous advantages of the present invention will be more fully understood from the detailed description of the steps of an illustrative method taken in connection with the accompanying drawings in which.

Figure 1:
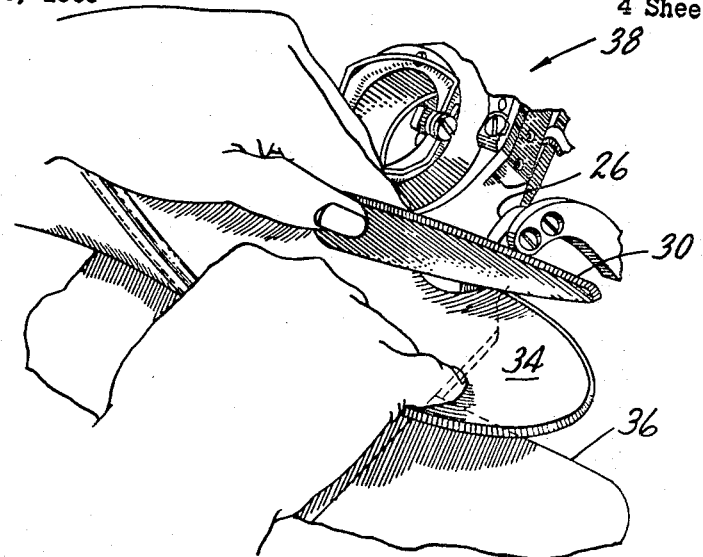
FIG. 1 is a view in perspective of moccasin parts being processed according to the present invention.

Turning now to the drawings particularly FIGS. 1, 5, 6 and 14, it will be seen that the method of the present invention is conveniently carried out on a basic lock stitch sewing machine such as that disclosed in United States Letters Patent Ser. No. 2,420,643, issued May 20, 1947, upon application of Fred Ashworth. The basic machine which is appropriately modified for moccasin work comprises a curved hook needle 20 and a curved work piercing awl 22. In addition to the needle 20 in the awl 22, the machine includes a normal complement of work feeding and stitch forming instrumentalities. The work is fed by a clamp including a work support indicated generally at 24 and a presser foot 26. The work support 24 is formed with two work engaging surfaces, one of which is an upper striated surface 28 upon which a plug 30 is received and on which its margin is clamped by the presser foot 26, and the other of which is the lower surface 32 which is smooth and adapted to receive the margin of a vamp 34. The central portion of the vamp 34 is supported on a table 36. The vamp 34 is presented to the machine with the flesh side up and the plug 30 with the flesh side down, both parts being skived at the seam receiving margin. The stitch forming instrumentalities of the basic machine include a shuttle or loop taker indicated generally at 38 in FIG. 1 and a needle threading looper 40 shown in FIG. 12, the only stitch forming instrumentalities of a normal complement which form no part of the present invention.

The work support 24 is of generally triangular cross-section and at its inner apex includes a thinned web portion 42 which extends only to the right of the needle plane as seen in FIGS. 6 to 13 inclusive. The needle plane is the stationary median plane of the needle 20 and the awl 22 which are coplanar in the illustrative machine. Since the work is fed from right to left by instrumentalities including the work support 24, the web portion 42 approaches the needle plane most closely in the position of FIG. 7 as will later be explained. The plug 30 is fed a normal stitch length during the formation of each stitch by the clamp comprising the upper surface 28 of the work support 24 and the presser foot 26. A group of instrumentalities cooperates with the lower surface 32 of the work support for feeding the vamp 34 in such a way that the vamp is puckered between the stitch holes in order to match the longer edge of the vamp 34 to the shorter edge of the plug 30. The vamp feeding and puckering instrumentalities include a short puckering awl 48 which is driven upwardly part way through the thickness of the vamp 34 and then advanced toward the needle plane a distance greater than the motion imparted to the plug 30 so that the vamp 34 is puckered prior to being locally secured to the plug by a stitch. Cooperating with the puckering awl 48 is the machine awl 22 and a retainer 50 in the form of a short lever pivoted at 52 on the work support 24. The function of the retainer 50 is to clamp the margin of the vamp near the sewing point so that the longitudinal compression imparted to the vamp by the puckering awl 48 does not merely cause slippage of the vamp in the direction of work feed, to the left, instead of puckering.

Figure 2:
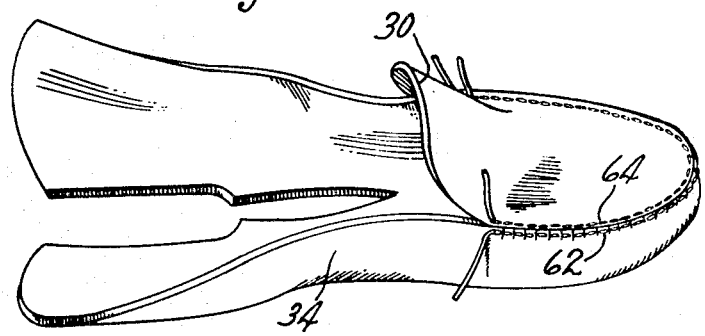
FIG. 2 is a detail view of moccasin parts including a vamp and a plug joined together according to the present invention but before the back has been closed.
Figure 7:
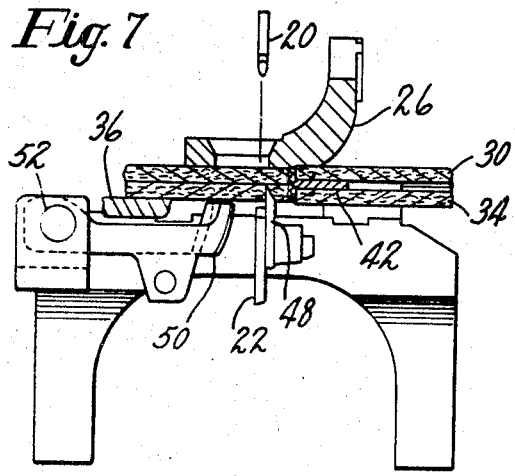
FIGS. 7 through 12 are progressive detail views in front elevation showing the feeding of the parts of the moccasin and the formation of a stitch.

In the formation of each stitch and the feeding of the plug 30 and the vamp 34 prior to forming the stitch, the forepart of the vamp is operated upon while in essentially flat condition at the beginning of the sewing operation. As shown in FIG. 2, the backpart may be left open while the seam joining the plug to the vamp is being inserted and the vamp closed only after the seam is completed. The vamp shown in FIG. 1 however while not completely illustrated is transversely slightly bulged in the forepart because its backpart has been closed, only the forepart remaining essentially flat at the start of the sewing operation. It will also be appreciated as the description of the sewing operation progresses that the steps described are susceptible to being performed by hand with simple hand held implements. As shown in FIG. 7, the puckering awl 48 has penetrated into the vamp 34 and both the needle 20 and the awl 22 are out of the work but the awl 22 which operates in a single stationary plane has been reached and contacted by the puckering awl 48. At this time the work feeding clamp comprising the work support 24 and the presser foot 26 is at the extreme leftward end of its travel and the retainer 50 is out of engagement with the vamp.

Figure 8:
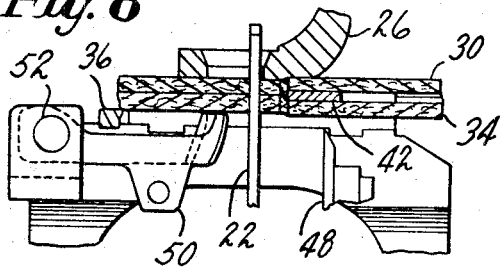

As shown in FIG. 8, the awl 22 has penetrated through both the vamp 34 and the plug 30 for the purpose of temporarily holding the parts in a desired relative position and to form a perforation for passage of the needle 20. At this time, the puckering awl 48 has been back fed a distance equal to the length between the stitch holes on the vamp 34. The retainer 50 is still out of engagement with the vamp 34.

Figure 9:
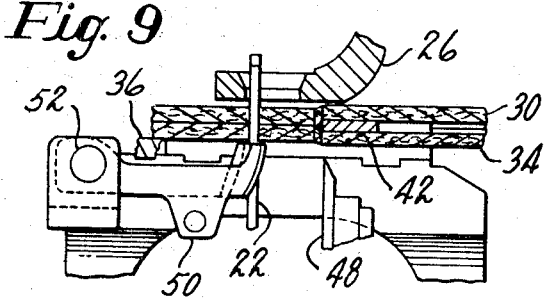

As shown in FIG. 9, after the vamp 34 and the plug 30 have been impaled upon the machine awl 22, the work feeding clamp consisting of the presser foot 26 and the work support 24, as seen by the web 42, is back fed. The back feeding motion of the work support, to the right as seen in FIG. 9, brings the free end of the retainer 50 into embracing relationship with the awl as seen in FIGS. 9 and 10 but the retainer 50 is still out of engagement with the vamp 34.

Figure 10:
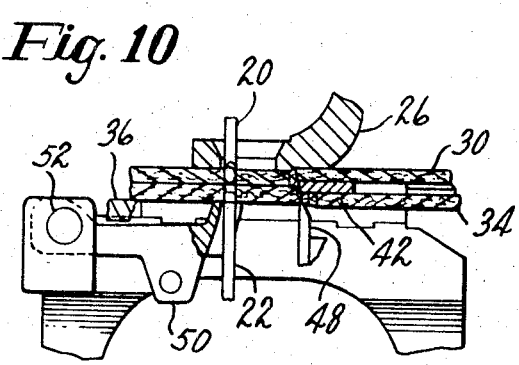

As shown in FIG. 10, the puckering awl 48 has begun to penetrate the vamp 34 while the machine awl 22 is withdrawing and the needle 20 is following the awl 22 into the perforation in the plug 30 and the vamp 34. At this time, the work feeding clamp comprising the work support 24 and the presser foot 26 has not yet begun its work feeding movement and the puckering awl 48 is penetrating the work piece at a distance from the awl 22 equal to the total distance between stitch holes in the vamp. As the awl 22 withdraws from the work and is followed by the needle 20 into the stitch hole, the retainer 50 moves into engagement with and presses the vamp 34 against the underside of the work support 24 to prevent slippage of the vamp during the puckering motion of the awl which is to follow.

Figure 11:
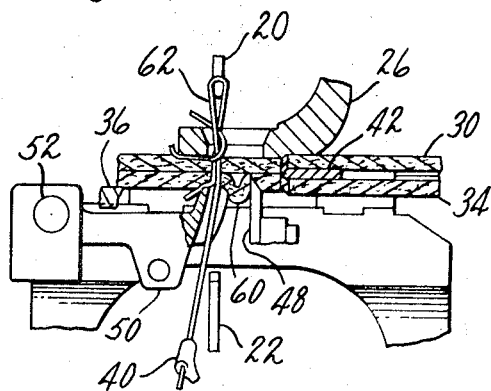

As seen in FIG. 11, the puckering awl 48 has advanced leftwardly while the work feeding clamp has remained essentially stationary. Accordingly, that portion of the vamp margin between the point of engagement with the retainer 50 which has remained stationary and the awl 48 has been puckered downwardly as shown at 60. At this time, the needle 20 having penetrated fully into the work piece in order to be threaded by the looper 40, is in the process of withdrawing carrying a loop of needle thread 62.

Figure 12:
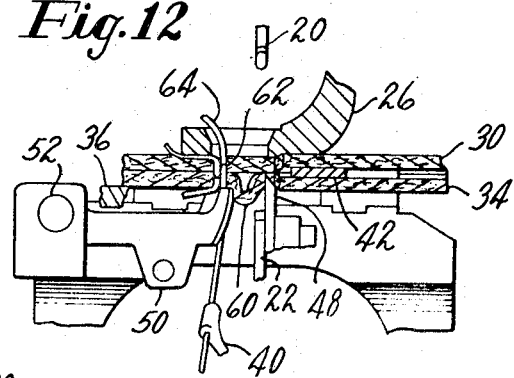

As shown in FIG. 12, the work piece has been fed to the left by the work feeding clamp comprising the work support 24 and the presser foot 26 and the puckering awl 48 has also moved to the left approximately to the same extent from the position of FIG. 11 as the motion of the work feeding clamp. Accordingly, the awl 48 is now in contact with the machine awl 22 which merely reciprocates in a fixed plane of the machine and has no longitudinal motion to the right or to the left. As also shown in FIG. 12, the needle loop 62 has been interlocked with a locking thread 64 to form a first stitch which has been set in the body of the work. After the setting of the stitch, the retainer 50 is withdrawn from engagement with the vamp 34 while the set stitch prevents relative slippage between the vamp and the plug 30. The relative positions of the machine awl 22 and of the puckering awl 48 are the same in FIG. 12 as they are in FIG. 7. However, in FIG. 7 there is no set stitch to maintain the vamp 34 and the plug 30 relatively oriented so that a pucker can take place since FIG. 7 shows the operations preceding the formation of the first stitch. At the same time, the retainer 50 in FIG. 7 is out of engagement with the vamp 34 which is free to move leftwardly.

Figure 13:
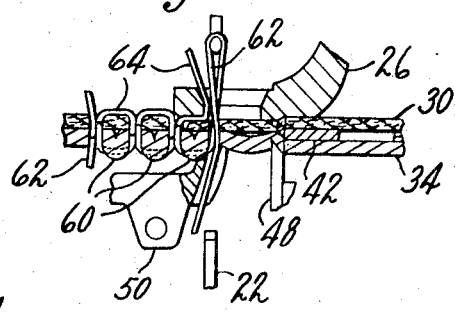
FIG. 13 is a view similar to FIGS. 7 to 12 inclusive but showing the moccasin parts joined by several stitches.

As shown in FIG. 13 there are four completed stitches, the vamp 34 is shown having been puckered at 60 and the puckers secured by lock stitches formed by the interlocking of the needle thread 62 with the locking thread 64.

Figure 14:
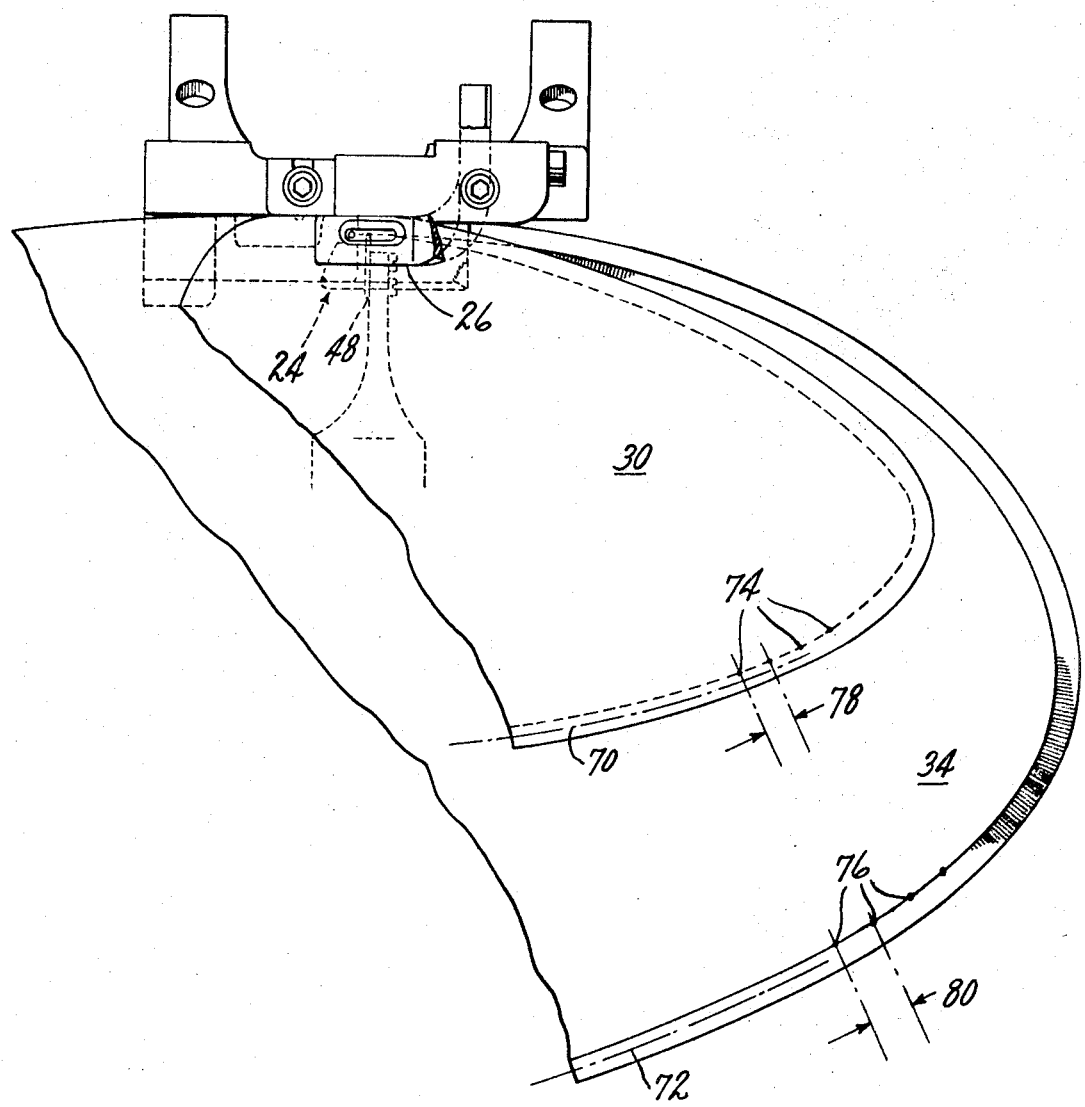
FIG. 14 is a plan view illustrating the relationship of a moccasin vamp and plug at the beginning of an assembly operation according to the present method.

As shown in FIG. 14 the plug 30 and vamp 34 are in essentially flat condition at the start of the sewing operation. The center line of stitch holes to be inserted in the plug 30 and the vamp 34 is indicated respectively at 70 and 72 on each of which several prospective stitch holes are depicted. In the plug 30 and vamp 34 the stitch holes are designated at 74 and 76 respectively. The distance indicated by the reference numeral 78 between stitch holes 74 on the plug 30 is equal to the distance of travel of the work feeding clamp comprising the work support 24 and the presser foot 26. The distance 80 between stitch holes 76 on the vamp 34 is greater than the distance 78, the difference accounting for the amount of puckering which has already been described.

The product of the present invention is characterized not only by greater uniformity as a result of accurate control of stitch length and puckering but also by greater durability than is obtained in moccasins produced by conventional hand methods. The greater durability is obtained while retaining the comfort and appearance factors which made hand sewn moccasins popular. The reason for the greater durability is that the lock stitch seam employed for securing the vamp to the plug according to one aspect of the present invention presents a barrier to thread movement and thus prevents local loosening of the seam by the presence of a thread lock in each stitch hole. By contrast, a conventional moccasin seam permits the looseness which develops in the seam to gather in a particular locality generally at the bend across the toes and this looseness leads to a premature failure of the seam which for all practical purposes results in irreparable damage to the shoe.

Figure 3:
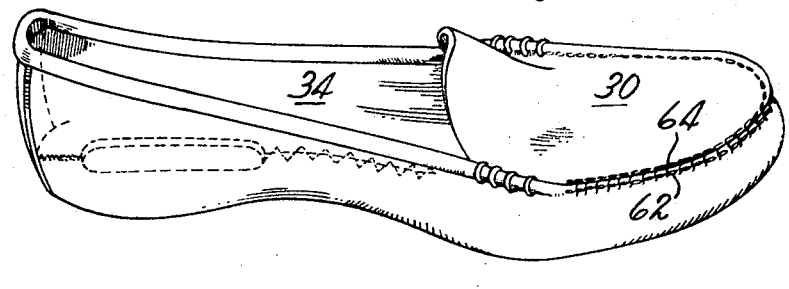
FIG. 3 is a view of a moccasin assembled according to the present method but with the back closed.
Figure 4:
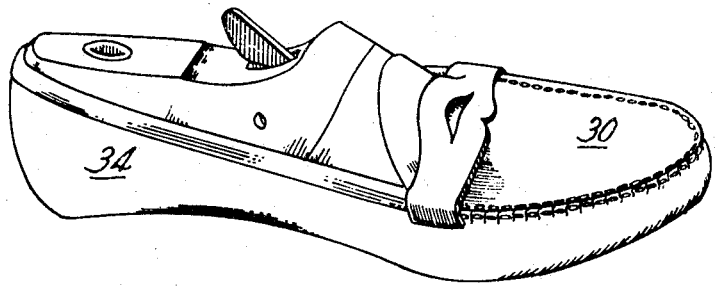
FIG. 4 is a view of a moccasin according to the present invention after mounting on a last.
Figure 5:
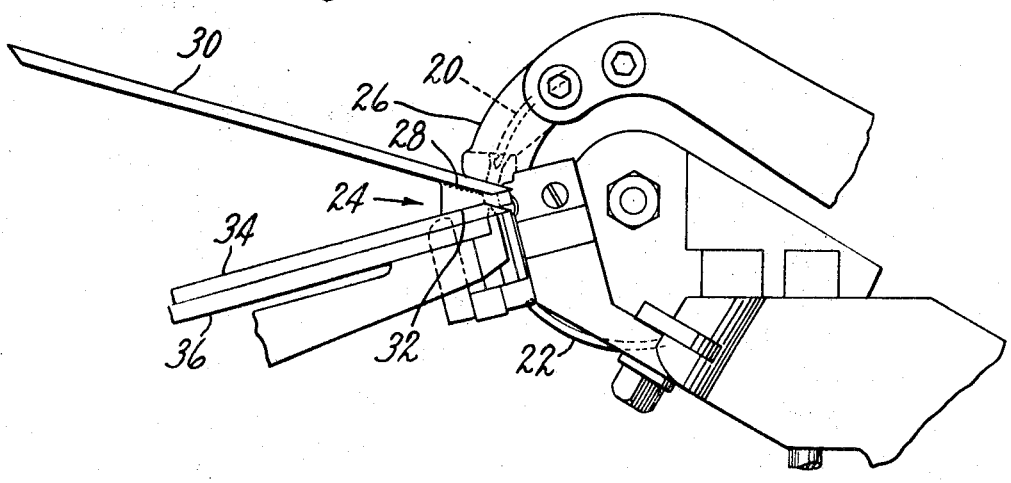
FIG. 5 is a view in side elevation of moccasin parts being processed on a suitable machine for joining the parts in accordance with the method of the present invention.
Figure 6:
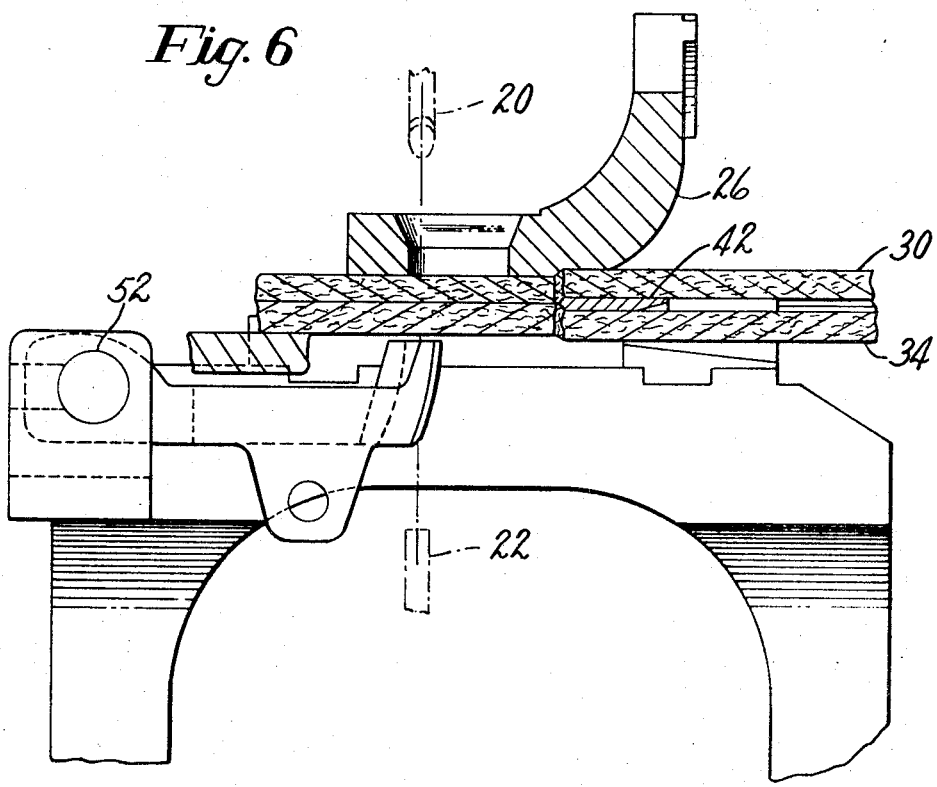
FIG. 6 is a view in front elevation and on an enlarged scale of the moccasin parts shown being processed on the same machine as that of FIG. 5.

Prior to inserting a last (FIG. 4) in the moccasin of FIG. 3, the interconnected vamp and plug may be subjected to a mulling operation to enhance the final shaping operation in preparation for the conventional finishing operations to be performed.

From the foregoing description of an illustrative method, those skilled in the art will derive benefits from practicing some of the steps of the illustrative method while omitting others. It is accordingly not intended that the foregoing description should be considered as a limitation but rather that the present invention be defined by the accompanying claims.

Having thus described my invention, what I claim as new and desire to secure by Letters Patent of the United States is:

1. A method of manufacturing a composite article comprising the steps of: providing a set of parts including a first and a second part each having a seam receiving margin, the margin of the second part being longer than that of the first, presenting each of the two parts to a sewing point in substantially flat condition with their inner surfaces in closely spaced relationship and the starting points of their seam receiving margins in register and thereafter progressively and uniformly puckering the edge of the second part while progressively inserting a lockstitch seam joining the second to the first part thereby shortening the margin of the second part to match that of the first part.

2. A method of manufacturing a true moccasin comprising the steps of: providing a set of moccasin parts including a plug and a true moccasin vamp each having a seam receiving margin, the seam receiving margin of the vamp being longer than that of the plug, presenting to a sewing point both the plug and the vamp with their inner surfaces in closely spaced relationship and starting points of their seam receiving margins in register, and thereafter puckering the edge of the vamp while progressively inserting a lockstitch seam joining the vamp to the plug thereby shortening the margin of the vamp to match that of the plug.

3. The method of claim 2 further characterized in that puckering is accomplished by securing together corresponding points on the plug and vamp to limit relative displacement, impaling the vamp upon an awl and advancing the awl toward the point of securement.

4. The method of claim 3 further characterized in that the vamp and plug are secured together by a stitch penetrating both parts near the point of impalement.

5. A method of manufacturing a true moccasin comprising the steps of: providing a set of moccasin parts including a plug and a true moccasin vamp each having a seam receiving margin, the seam receiving margin of the vamp being longer than that of the plug, presenting to a sewing point both the plug and the vamp with their inner surfaces in closely spaced relationship and starting points of their seam receiving margins in register, clamping the parts in register about the sewing point, penetrating both parts with a hook needle and retracting the needle carrying a loop of thread, interlocking the needle thread loop with a locking thread to form a lockstitch, impaling the vamp upon an awl at a point separated from the sewing point, advancing both parts toward the sewing point, overfeeding the awl toward the sewing point to cause puckering of the margin of the vamp and progressively repeating the feeding and stitch forming steps thereby inserting a lockstitch seam joining the vamp to the plug while shortening the margin of the vamp to match that of the plug.

6. A method of manufacturing a true moccasin comprising the steps of: providing a set of moccasin parts including a plug and a true moccasin vamp each having a seam receiving margin, the seam receiving margin of the vamp being longer than that of the plug, presenting to a sewing point the plug and forepart of the vamp in substantially flat condition with their inner surfaces in closely spaced relationship and the starting points of their seam receiving margins in register and thereafter longitudinally puckering the margin of the vamp while progressively inserting a seam joining the vamp to the plug thereby shortening the margin of the vamp to match that of the plug as the insertion of the seam progresses.

7. A method according to claim 6 further characterized in that the forepart of the vamp and plug are formed into an open pouch as the seam is inserted.

8. A method according to claim 7 further comprising the step of forcing a last into the pouch to impart a shoe shape to the interconnected vamp forepart and plug.

9. A method according to claim 8 further comprising the step of mulling the interconnected vamp and plug prior to insertion of the last.

10. A method according to claim 7 further characterized in that the plug and vamp are joined by a lockstitch seam.

References Cited

UNITED STATES PATENTS

| | | | |
|---|---|---|---|
| 452,179 | 5/1891 | Eighmie | 2—125 |
| 1,294,711 | 2/1919 | Rowan | 2—125 X |
| 2,946,069 | 7/1960 | Bozza | 12—142 |

PATRICK D. LAWSON, Primary Examiner